(12) United States Patent
Zhu et al.

(10) Patent No.: US 12,092,478 B2
(45) Date of Patent: Sep. 17, 2024

(54) APPARATUS AND METHOD FOR MEASURING AND DRAWING WIDE-AREA SPATIAL CHANNEL MAP THROUGH MULTI-UNMANNED AERIAL VEHICLE (UAV) COOPERATION

(71) Applicant: Nanjing University of Aeronautics and Astronautics, Nanjing (CN)

(72) Inventors: Qiuming Zhu, Nanjing (CN); Kai Mao, Nanjing (CN); Yanheng Qiu, Nanjing (CN); Xiaomin Chen, Nanjing (CN); Boyu Hua, Nanjing (CN); Zhipeng Lin, Nanjing (CN); Xuchao Ye, Nanjing (CN); Weizhi Zhong, Nanjing (CN); Fuqiao Duan, Nanjing (CN); Qihui Wu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/227,988

(22) Filed: Jul. 31, 2023

(65) Prior Publication Data
US 2024/0271961 A1 Aug. 15, 2024

(30) Foreign Application Priority Data
Feb. 9, 2023 (CN) .......................... 202310084902.7

(51) Int. Cl.
*G01C 21/00* (2006.01)
(52) U.S. Cl.
CPC ..... *G01C 21/3852* (2020.08); *G01C 21/3841* (2020.08); *G01C 21/3848* (2020.08)
(58) Field of Classification Search
None
See application file for complete search history.

(56) References Cited

U.S. PATENT DOCUMENTS

| 2017/0029107 A1* | 2/2017 | Emami | ................ G08G 5/0069 |
| 2022/0286247 A1* | 9/2022 | Liu | ....................... H04L 5/0094 |

FOREIGN PATENT DOCUMENTS

| CN | 109409225 A | * | 3/2019 | ......... G06K 9/00503 |
| CN | 109409225 A | | 3/2019 | |

(Continued)

OTHER PUBLICATIONS

Liu Liu, et al., Massive MIMO propagation characteristics in indoor scenario based on propagation graph modeling, Journal of Beijing Jiaotong University, 2018, pp. 38-45, vol. 42, No. 2.

*Primary Examiner* — Hunter B Lonsberry
*Assistant Examiner* — Robert Louis Pinkerton
(74) *Attorney, Agent, or Firm* — Bayramoglu Law Offices LLC (57) ABSTRACT

According to a surveying and mapping instrument and method for a wide-area spatial channel map through multi-unmanned aerial vehicle (UAV) cooperation, a measurement signal emission unit generates and emits a measurement signal, a measurement signal multi-UAV cooperative receiving unit receives the measurement signal transmitted through a wireless channel, extracts an effective multipath component from the measurement signal, and frames the effective multipath component and corresponding time and location information for storage, and transmits stored channel data to a channel data fusion processing unit offline, and the channel data fusion processing unit fuses the channel data in terms of space, time, and frequency dimensions, and completes missing channel data to construct a complete wide-area spatial channel map.

7 Claims, 4 Drawing Sheets

(56) References Cited

FOREIGN PATENT DOCUMENTS

| CN | 112616184 | A | 4/2021 |
| CN | 113534204 | A | 10/2021 |
| CN | 113709072 | A | 11/2021 |
| CN | 114268397 | A | 4/2022 |
| CN | 114567399 | A | 5/2022 |
| CN | 115542350 | A | 12/2022 |
| CN | 115567129 | A | 1/2023 |
| WO | 2021175344 | A2 | 9/2021 |

* cited by examiner

APPARATUS AND METHOD FOR MEASURING AND DRAWING WIDE-AREA SPATIAL CHANNEL MAP THROUGH MULTI-UNMANNED AERIAL VEHICLE (UAV) COOPERATION

CROSS REFERENCE TO THE RELATED APPLICATIONS

This application is based upon and claims priority to Chinese Patent Application No. 202310084902.7, filed on Feb. 9, 2023, the entire contents of which are incorporated herein by reference.

TECHNICAL FIELD

The present disclosure relates to the field of wireless information transmission, and specifically, to a surveying and mapping instrument and method for a wide-area spatial channel map through multi-unmanned aerial vehicle (UAV) cooperation, particularly for multi-UAV cooperative channel measurement and data fusion processing in wide-area space.

BACKGROUND

UAVs are widely used in aerial base stations, relay communication, and other fields due to their advantages of high maneuverability, ease of operation, and low costs. A stable and reliable UAV communication system is important for supporting the rapid development of UAV technology. Forming a theoretical basis for the design and optimization of UAV communication systems requires a deep understanding of characteristics of a UAV channel. Obtaining accurate and complete channel data is an important prerequisite for constructing a UAV channel map and analyzing the characteristic of the UAV channel. Therefore, research on UAV-based channel measurement is of great significance.

Using a single UAV for channel measurement is limited by load, endurance, onboard storage, and other factors of the UAV resulting in a high time-consumption and a small storage capacity. Thus, making it difficult to complete large-scale, fully three-dimensional, and high-density wide-area spatial channel measurement in a short period of time. This poses a significant challenge for constructing a complete channel map and analyzing the characteristic of the UAV channel. Therefore, the present disclosure uses a surveying and mapping instrument and method for a wide-area spatial channel map through multi-UAV cooperation to extract effective multipath components from signals received by a plurality of UAVs and mark time, location, and other information of each UAV. This can significantly reduce the amount of onboard stored data of each UAV, effectively and conveniently complete cooperative measurement of a wide-area spatial channel, and construct a complete channel map.

SUMMARY

In order to overcome the shortcomings in the prior art, the present disclosure provides a surveying and mapping instrument and method for a wide-area spatial channel map through multi-UAV cooperation, to extract an effective multipath component from a channel impulse response obtained by each UAV to greatly reduce an amount of onboard stored data of each UAV, and label time, location, and other information of each UAV to achieve cooperative measurement of a wide-area spatial channel. A ground server fuses and completes collected high-dimensional channel data, and finally generates a complete wide-area spatial channel map to further evaluate and optimize performance of a UAV communication system.

To achieve the above objective, the present disclosure adopts following technical solutions:

A surveying and mapping instrument for a wide-area spatial channel map through multi-UAV cooperation includes a measurement signal emission unit, a measurement signal multi-UAV cooperative receiving unit, and a channel data fusion processing unit, where the measurement signal emission unit generates and emits a measurement signal, the measurement signal multi-UAV cooperative receiving unit receives the measurement signal transmitted through a wireless channel, extracts effective multipath components from the measurement signal, the effective multipath components and corresponding time and location information for storage, and transmits stored channel data to the channel data fusion processing unit offline, and the channel data fusion processing unit fuses the channel data in terms of space, time, and frequency dimensions, and completes missing channel data to construct a complete wide-area spatial channel map.

In order to optimize the technical solution, the following specific measures are also used.

Further, the measurement signal emission unit includes a measurement parameter configuration module, a measurement signal generation module, a power amplifier module, and a Global Position System (GPS) module 1, where the measurement parameter configuration module is utilized to configure channel measurement parameters, the measurement signal generation module generates the measurement signal based on the configured channel measurement parameters, the power amplifier module performs power amplification on the generated measurement signal, such that the amplified measurement signal is emitted by an emission antenna, and the GPS module 1 uses a pulse per second signal to trigger the emission of the measurement signal.

Further, the measurement signal multi-UAV cooperative receiving unit includes M measurement signal aerial receiving nodes, and each of the measurement signal aerial receiving nodes includes a low noise amplifier module, a channel response extraction module, a system response elimination module, a channel response compensation module, a multipath component extraction module, a GPS module 2, a channel parameter framing module, and an UAV data storage module, where the low noise amplifier module performs low noise amplification on the measurement signal received by a receiving antenna and transmits the amplified measurement signal to the channel response extraction module, the channel response extraction module extracts an original channel impulse response, the system response elimination module obtains a system response of a measurement system through a back-to-back measurement and eliminates the system response, the channel response compensation module compensates for a power loss of a channel impulse response due to a sampling time offset between receiving and emission nodes, the multipath component extraction module extracts effective multipath components from the channel impulse response by adopting an adaptive noise threshold, the GPS module 2 uses a pulse per second signal to trigger the reception of the measurement signal, and obtains time and location information of the measurement signal aerial receiving nodes, the channel parameter framing module frames the effective multipath components and corresponding time and location information, and framed channel data is stored in the UAV data storage module.

Further, the channel data fusion processing unit includes a channel data storage module, a channel data fusion module, a channel data completion module, and a channel map generation module, where in a ground server, the channel data storage module performs offline transmission and storage on the channel data stored by the UAV data storage module, the channel data fusion module fuses the collected channel data in terms of the space, time, and frequency dimensions, the channel data completion module completes the missing channel data in wide-area space to obtain complete channel data, and the channel map generation module constructs the wide-area spatial channel map based on the complete channel data.

The present disclosure further provides a surveying and mapping method for a wide-area spatial channel map through multi-UAV cooperation, including following steps:

step 1: configuring channel measurement parameters, and generating a measurement signal based on the configured measurement parameters, performing power amplification on the measurement signal, and then radiating the amplified measurement signal by using an emission antenna of a measurement signal emission unit;

step 2: receiving, by a receiving antenna of each measurement signal aerial receiving node, the measurement signal transmitted through a wireless channel, extracting an original channel impulse response from the measurement signal after performing low noise amplification on the measurement signal, obtaining a system response of a measurement system through a back-to-back measurement and eliminating the system response, compensating for a power loss of a channel impulse response due to a sampling time offset between receiving and emission nodes, extracting effective multipath components from the channel impulse response by adopting an adaptive noise threshold, and framing the effective multipath components and corresponding time and location information for storage; and step 3: fusing framed channel data in terms of space, time, and frequency dimensions, and completing missing channel data to generate a wide-area spatial channel map.

Further, in step 1, the channel measurement parameters include a center frequency f, a sampling rate $f_s$, a measurement signal length $N_{seq}$, a sinc filter oversampling rate I, a reference unit length W, a protection unit quantity $N_P$, and a false alarm probability P; sinc(•) denotes a sinc function; and the measurement signal x[n] is generated based on the configured measurement parameters:

$$x[n] = \exp\left(-\frac{j\pi n^2}{N_{seq}}\right)$$

where n=0, 1, ..., $N_{seq}$−1, and j denotes an imaginary number.

Further, step 2 includes following specific substeps:

step 2.1: obtaining the original channel impulse response $h_s[n]$:

$$h_s[n]=y[n]*\hat{x}*[n]$$

where y[n] represents the measurement signal transmitted through the wireless channel, $\hat{x}*[n]$ represents a conjugate inverse sequence of the measurement signal x[n], and * represents a convolution operation;

step 2.2: calculating a channel frequency domain transfer function $H_s[k]$:

$$H_s[k]=Y[k]\cdot\hat{X}*[k]$$

where $H_s[k]$ represents a frequency domain representation of the h[n], and Y[k] and $\hat{X}*[k]$ respectively represent Fourier transforms of the y[n] and the $\hat{x}*[n]$;

step 2.3: obtaining the system response G[k] of the measurement system through back-to-back connection, eliminating the system response, and obtaining the channel impulse response h[n]:

$$h[n]=\text{IFFT}(H_s[k]/G[k])$$

where IFFT(•) represents inverse Fourier transform;

step 2.4: performing power compensation on the channel impulse response h[n] with the sampling time offset according to a following formula:

$$h_{STOC}[m] = \sum_{n=m-1}^{m+1} h[n]\cdot\text{sinc}\left(\frac{m-n}{I}\right)$$

where $h_{STOC}$[m] represents a compensated channel impulse response, m=0, 1, ..., N−1, and N represents a sequence length of the h[n];

step 2.5: generating the adaptive noise threshold Thr[l] for the compensated channel impulse response $h_{STOC}$[m]:

$$Thr[l] = \alpha\cdot\frac{1}{W}\left[\sum_{w=l-\frac{W}{2}-\frac{N_p}{2}}^{l-\frac{N_p}{2}-1} h_{STOC}[w] + \sum_{w=l+\frac{N_p}{2}+1}^{l+\frac{W}{2}+\frac{N_p}{2}} h_{STOC}[w]\right]$$

where $$l = 1 + \frac{W}{2} + \frac{N_p}{2},$$

..., $$N - \frac{W}{2} - \frac{N_p}{2},$$

and $$\alpha = W\cdot\left(P^{-\frac{1}{W}} - 1\right)$$

represents a threshold factor;

step 2.6: extracting the effective multipath components S from the channel impulse response by using the adaptive noise threshold according to a following formula:

$$S=\{\tau_i,P_i|\text{peak}(h_{STOC}[l])>Thr[l]\}$$

where $\tau_i$ and $P_i$ respectively represent a delay and power of an $i^{th}$ extracted effective multipath component, and peak(•) represents an operation of obtaining a peak value of the channel impulse response; and step 2.7: framing a multipath component extracted by a $p^{th}$ measurement signal aerial receiving node and its corresponding time and location information to form the channel data that is represented by a tensor $\Gamma_p$:

$$\Gamma_p=\{S_p,L_{RX,p},L_{TX},t_p,f_p\}\in R^{I_1\times I_2\cdots\times I_{10}}$$

where p∈[1,M], M represents a quantity of measurement signal aerial receiving nodes, $S_p$ represents a vector of the effective multipath component extracted by the $p^{th}$ measurement signal aerial receiving node; $L_{RX,p}$ and $L_{TX}$ respectively represent three-dimensional location vectors of the $p^{th}$ measurement signal aerial receiving node and the measurement signal emission unit, $t_p$ represents a time vector, $f_p$ represents a frequency vector, and $I_1 \times I_2 K \times I_{10}$ represents that the $\Gamma_p$ is a $10^{th}$-order real tensor.

Further, step 3 includes following specific substeps:

step 3.1: fusing the channel data to obtain a representation of a spatial tensor £ of a wide-area spatial channel:

$$£ = M(\Gamma_1, \Gamma_2, \ldots, \Gamma_p, \ldots, \Gamma M)$$

where $M(\cdot)$ represents a high-dimensional channel data fusion operator; and step 3.2: completing a tensor of the missing channel data in the wide-area spatial channel according to a following formula:

$$\min_\chi \text{rank}(\chi)$$
$$\text{s.t.} \ \chi_\Omega = £_\Omega$$

where $\chi$ represents a tensor formed by modeling complete data of the wide-area spatial channel, $\Omega$ represents a set of measurement signal aerial receiving nodes, an element $£_\Omega$ of the spatial tensor £ of the wide-area spatial channel in the $\Omega$ represents channel data obtained by each measurement signal aerial receiving node, and $\text{rank}(\cdot)$ represents an operation of obtaining a rank of the tensor.

The present disclosure has following advantages:

1) The present disclosure provides a surveying and mapping instrument for a wide-area spatial channel map through multi-UAV cooperation, which has advantages of high reliability, low load, and strong real-time performance. The instrument is suitable for cooperative measurement of wide-area spatial channels of a plurality UAVs, and resolves problems of the UAV, such as a small amount of onboard stored data, and difficulty in performing large-range, fully three-dimensional, and high-density channel measurement.

2) The present disclosure provides a surveying and mapping method for a wide-area spatial channel map through multi-UAV cooperation, which enhances onboard storage efficiency by accurately extracting effective multipath components from a channel impulse response obtained by each UAV. In addition, the method achieves fusion and completion of wide-area spatial channel data, and achieves research on surveying and mapping for a wide-area spatial channel map.

DETAILED DESCRIPTION OF THE EMBODIMENTS

The present disclosure is described in further detail below with reference to the accompanying drawings.

Embodiment 1

Figure 1:
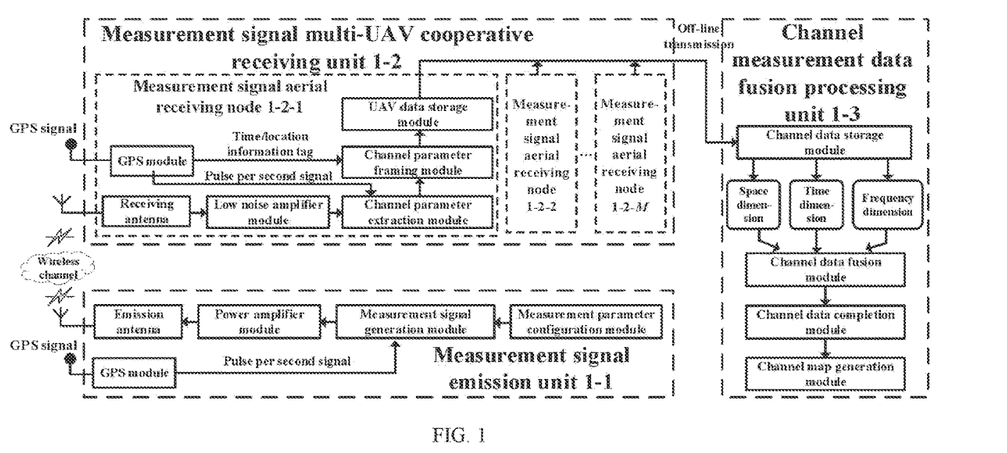
FIG. 1 is a schematic structural diagram of a surveying and mapping instrument for a wide-area spatial channel map through multi-UAV cooperation according to the present disclosure.

This embodiment provides a surveying and mapping instrument for a wide-area spatial channel map through multi-UAV cooperation. An overall structure of the instrument is shown in FIG. 1. The instrument mainly includes measurement signal emission unit 1-1, measurement signal multi-UAV cooperative receiving unit 1-2, and channel data fusion processing unit 1-3.

The measurement signal emission unit 1-1 emits a measurement signal and transmits the measurement signal to receiving antennas of measurement signal aerial receiving nodes 1-2-1 to 1-2-M in the measurement signal multi-UAV cooperative receiving unit 1-2 through a wireless channel. Onboard output interfaces of the measurement signal aerial receiving nodes 1-2-1 to 1-2-M are connected to an input interface of the channel measurement data fusion processing unit 1-3 in a ground server for offline transmission of channel data.

Specifically, the measurement signal emission unit 1-1 includes a measurement parameter configuration module, a measurement signal generation module, a power amplifier module, and a GPS module. The measurement parameter configuration module is configured to configure channel measurement parameters. The measurement signal generation module generates the measurement signal based on the configured parameters. The power amplifier module performs power amplification on the generated measurement signal, such that the amplified measurement signal is emitted by an emission antenna. The GPS module uses a pulse per second signal to trigger the emission of the measurement signal, achieving synchronization with signal reception at a receiving node.

Figure 2:
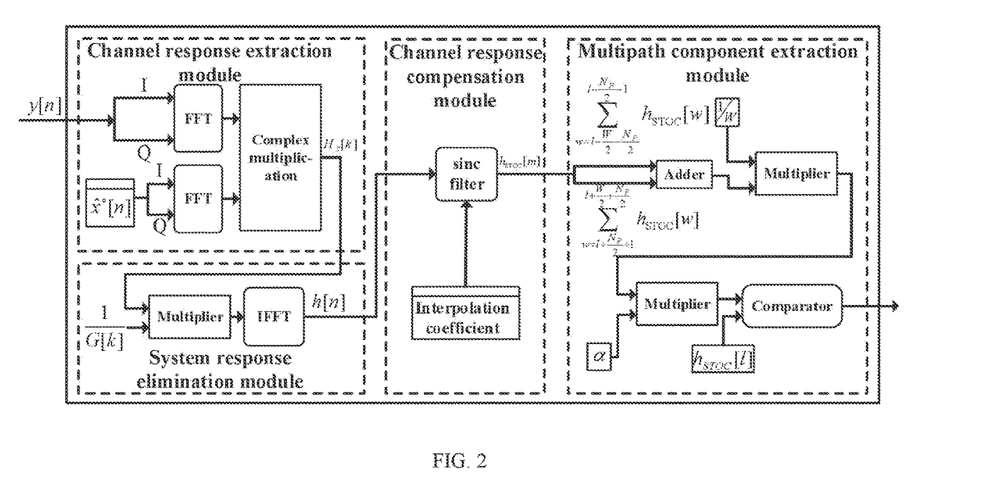
FIG. 2 is a schematic diagram of internal implementation of a channel parameter extraction module according to the present disclosure.

Specifically, the measurement signal multi-UAV cooperative receiving unit 1-2 includes the M measurement signal aerial receiving nodes 1-2-1 to 1-2-M. Each measurement signal aerial receiving node includes a low noise amplifier module, a channel parameter extraction module, a GPS module, a channel parameter framing module, and an UAV data storage module. As shown in FIG. 2, the channel parameter extraction module includes a channel response extraction module, a system response elimination module, a channel response compensation module, and a multipath component extraction module. The low noise amplifier module performs low noise amplification on the measurement signal received by the receiving antenna and transmits the amplified measurement signal to the channel response extraction module. The channel response extraction module extracts an original channel impulse response. The system response elimination module obtains a system response of a measurement system through a back-to-back measurement and eliminates the system response. The channel response compensation module compensates for a power loss of a channel impulse response due to a sampling time offset between a receiving node and the transmitting node. The multipath component extraction module extracts effective multipath components from the channel impulse response by adopting an adaptive noise threshold. The GPS module uses a pulse per second signal to trigger the reception of the measurement signal to achieve transceivers' time synchronization, and obtains time, location, and other information of the M measurement signal aerial receiving nodes 1-2-1 to 1-2-M. The channel parameter framing module frames the effective multipath component and time and location information that corresponds to the effective multipath components and is provided by the GPS module, and transmits framed data to each UAV data storage module. The UAV data storage module is configured to store channel data obtained by the measurement signal aerial receiving nodes 1-2-1 to 1-2-M.

Specifically, the channel data fusion processing unit 1-3 includes a channel data storage module, a channel data fusion module, a channel data completion module, and a channel map generation module. The channel data storage module performs offline transmission and storage on onboard stored high-dimensional channel data of the measurement signal aerial receiving nodes 1-2-1 to 1-2-M in the ground server. The channel data fusion module fuses the collected channel data in terms of space, time, and frequency dimensions. The channel data completion module completes missing channel data in wide-area space to obtain complete channel data. The channel map generation module constructs a wide-area spatial channel map based on the complete channel data.

Embodiment 2

This embodiment provides a surveying and mapping method for a wide-area spatial channel map through multi-UAV cooperation, which corresponds to the surveying and mapping instrument for a wide-area spatial channel map through multi-UAV cooperation in Embodiment 1.

Figure 3:
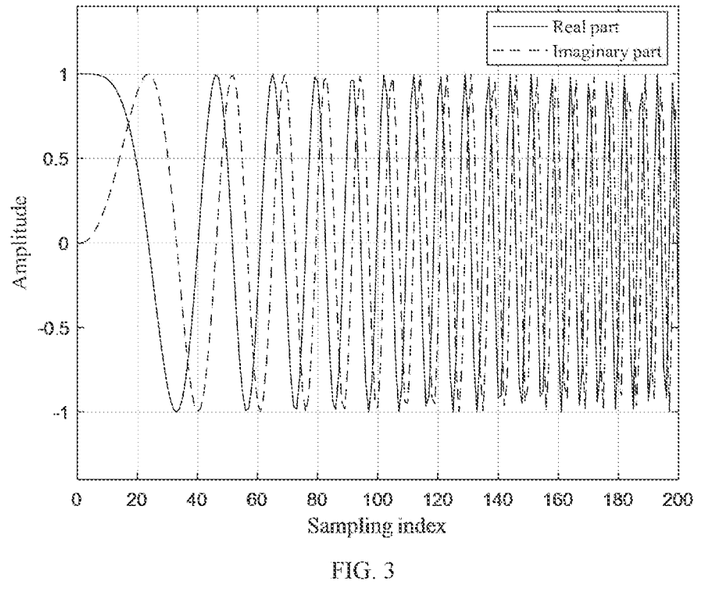
FIG. 3 is a schematic diagram of an output waveform of a measurement signal according to an embodiment.

In the method of this embodiment, a measurement center frequency f is set to 3.5 GHz, a sampling rate f is set to 100 MHz, a measurement signal length $N_{seq}$ is set to 1024, a sinc filter oversampling rate I is set to 16, a reference unit length W is set to 36, a protection unit quantity $N_P$ is set to 2, a false alarm probability P is set to $10^{-0.418}$, and sinc(•) denotes a sinc function. Specific implementation steps are as follows:

Step 1: A user configures the measurement center frequency f to 3.5 GHz, the sampling rate $f_s$ to 100 MHz, and the measurement sequence length $N_{seq}$ to 1024 by using a measurement parameter configuration module in measurement signal emission unit 1-1. Measurement signal x[n] with a length of $N_{seq}$ is generated according to formula (1), and a waveform of the measurement signal is shown in FIG. 3.

$$x[n] = \exp\left(-\frac{j\pi n^2}{N_{seq}}\right) \quad (1)$$

In the above formula, n=0, 1, . . . , $N_{seq}$−1, and j denotes an imaginary number.

Figure 4:
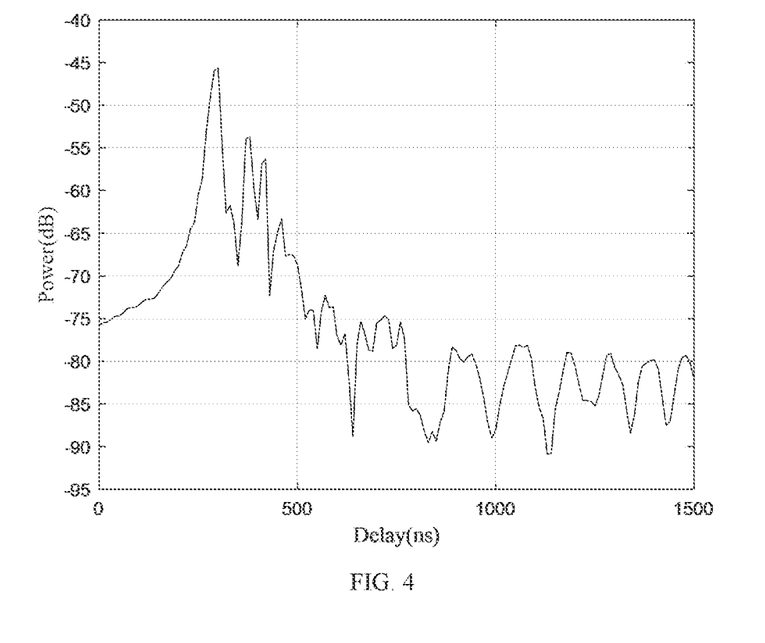
FIG. 4 is a schematic diagram of an output result of a channel response extraction module according to an embodiment.

Step 2: Receiving antennas of measurement signal aerial receiving nodes 1-2-1 to 1-2-M receive received signal y[n] transmitted through a wireless channel, and the received signal is amplified by a low noise amplifier module and then transmitted to a channel parameter extraction module for processing to extract effective multipath components S. Then, a GPS module obtains time, location, and other information of the measurement signal aerial receiving nodes 1-2-1 to 1-2-M. Finally, a channel parameter framing module frames the effective multipath components and the time and location information, and stores framed data in each UAV data storage module. Further, step 2 includes following specific implementation substeps:

Step 2.1: Original channel impulse response $h_s[n]$ is obtained according to formula (2), as shown in FIG. 4.

$$h_s[n]=y[n]*\hat{x}*[n] \quad (2)$$

In the above formula, $\hat{x}*[n]$ represents a conjugate inverse sequence of the measurement signal x[n], and * represents a convolution operation.

Step 2.2: A channel frequency domain transfer function $H_s[k]$ is calculated according to formula (3).

$$H_s[k]=Y[k]\cdot\hat{X}*[k] \quad (3)$$

In the above formula, $H_s[k]$ represents a frequency domain representation of the $h_s[n]$, and Y[k] and $\hat{X}*[k]$ respectively represent Fourier transforms of the y[n] and the $\hat{x}*[n]$.

Figure 5:
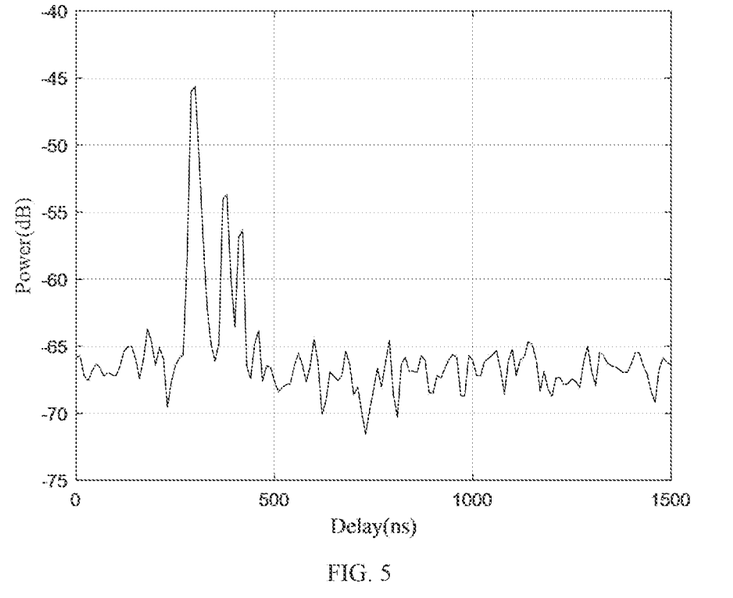
FIG. 5 is a schematic diagram of an output result of a system response elimination module according to an embodiment.

Step 2.3: System response G[k] of a measurement system is obtained through back-to-back connection. According to formula (4), the system response is eliminated and channel impulse response h[n] is obtained, as shown in FIG. 5.

$$h[n]=\text{IFFT}(H_s[k]/G[k]) \quad (4)$$

In the above formula, IFFT( ) represents inverse Fourier transform.

Figure 6:
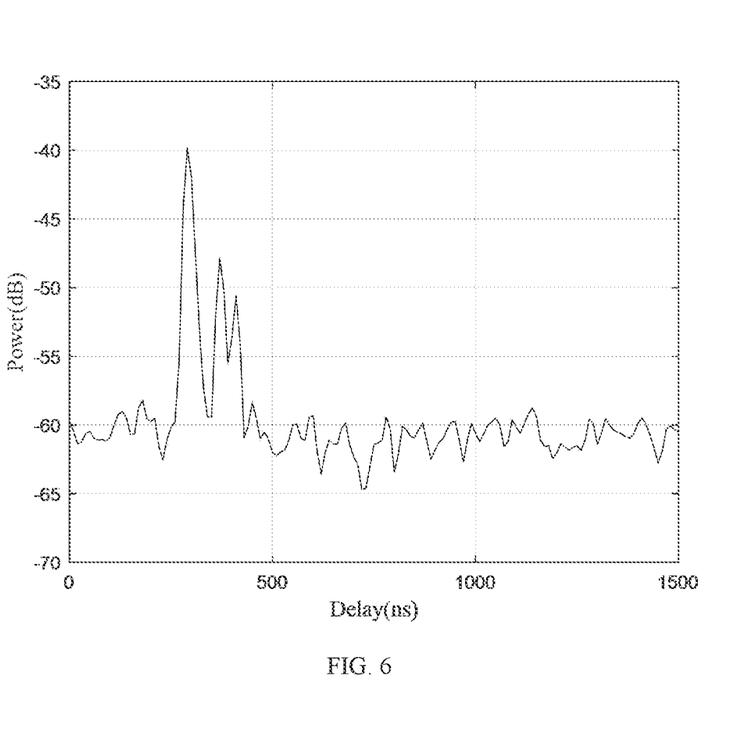
FIG. 6 is a schematic diagram of an output result of a channel response compensation module according to an embodiment.

Step 2.4: A power loss due to a sampling time offset is compensated for according to formula (5), as shown in FIG. 6.

$$h_{STOC}[m] = \sum_{n=m-1}^{m+1} h[n]\cdot\text{sinc}\left(\frac{m-n}{I}\right) \quad (5)$$

In the above formula, $h_{STOC}[m]$ represents a compensated channel impulse response, m=0, 1, . . . , N−1, and N represents a sequence length of the h[n].

Figure 7:
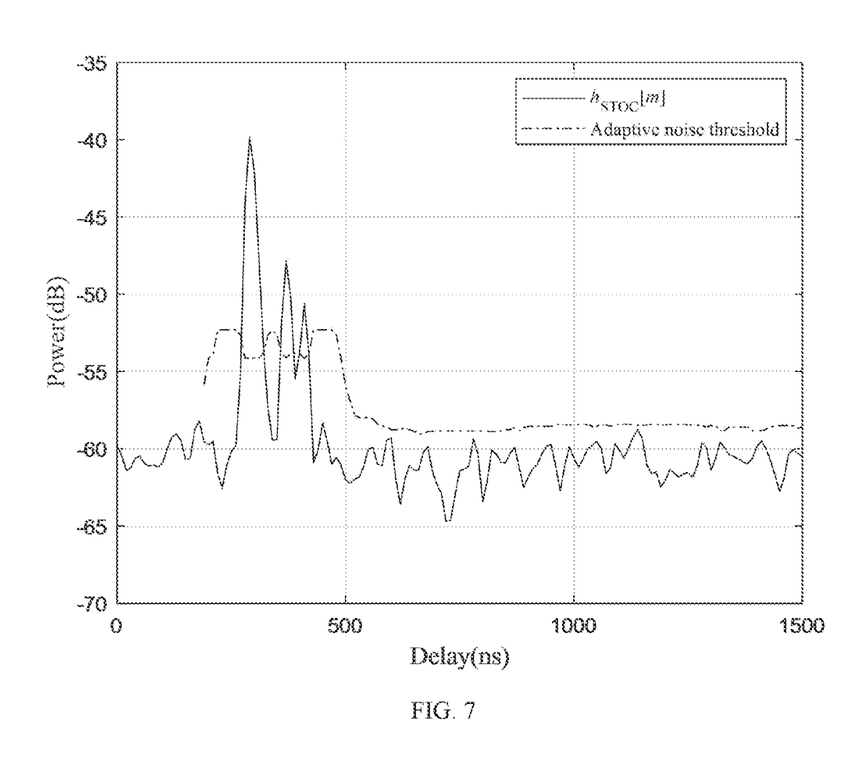
FIG. 7 is a schematic diagram of an output result of an adaptive noise threshold according to an embodiment.

Step 2.5: An adaptive noise threshold is generated according to formula (6), as shown in FIG. 7.

$$\text{Thr}[l] = \alpha\cdot\frac{1}{W}\left[\sum_{w=l-\frac{W}{2}-\frac{N_p}{2}}^{l-\frac{N_p}{2}-1} h_{STOC}[w] + \sum_{w=l+\frac{N_p}{2}+1}^{l+\frac{W}{2}+\frac{N_p}{2}} h_{STOC}[w]\right] \quad (6)$$

In the above formula, $$l = 1 + \frac{W}{2} + \frac{N_p}{2},$$

. . . , $$N - \frac{W}{2} - \frac{N_p}{2},$$

and $$\alpha = W\cdot\left(P^{\frac{1}{W}} - 1\right)$$

represents a threshold factor.

Step 2.6: The effective multipath component $S=\{\tau_i,P_i\}$ is extracted from the channel impulse response by using the generated adaptive noise threshold according to formula (7), as shown in Table 1.

$$S=\{\tau,P_i|\text{peak}(h_{STOC}[l])>Thr[l]\} \quad (7)$$

In the above formula, $\tau_i$ and $P_i$ respectively represent a delay and power of an $i^{th}$ extracted effective multipath component, and peak(•) represents an operation of obtaining a peak value of the channel impulse response.

TABLE 1

Effective multipath component

| Path quantity i | Delay τ (ns) | Power P (dB) |
| --- | --- | --- |
| 1 | 290 | −39.84 |
| 2 | 370 | −47.84 |
| 3 | 410 | −50.60 |

Step 2.7: High-dimensional channel data stored by a $p^{th}$ measurement signal aerial receiving node of the measurement signal aerial receiving nodes 1-2-1 to 1-2-M is represented according to formula (8).

$$\Gamma_p=\{S_p,L_{RX,p},L_{TX},t_p,f_p\}\in R^{I_1\times I_2\cdots \times I_{10}} \quad (8).$$

In the above formula, $p\in[1, M]$, M represents a quantity of measurement signal aerial receiving nodes, S, represents a vector of an effective multipath component extracted by the $p^{th}$ measurement signal aerial receiving node; $L_{RX;\,p}$ and $L_{TX}$ respectively represent three-dimensional location vectors of the $p^{th}$ measurement signal aerial receiving node and the measurement signal emission unit, $t_p$ represents a time vector, $f_p$ represents a frequency vector, and $I_1\times I_2 K\times I_{10}$ represents that the $\Gamma_p$ is a 10th-order real tensor.

Step 3: The user transmits stored onboard channel data of the measurement signal aerial receiving nodes 1-2-1 to 1-2-M to a channel data storage module offline by using channel measurement data fusion processing unit 1-3, performs data fusion by using a channel data fusion module, and finally completes channel data of an unknown location by using a channel data completion module, such that a channel map generation module generates a wide-area spatial channel map. Further, step 3 includes following specific implementation substeps:

Step 3.1: The high-dimensional channel data is fused according to formula (9) to obtain a representation of a wide-area spatial tensor.

$$\pounds=M(\Gamma_1,\Gamma_2,\ldots,\Gamma_p,\ldots,\Gamma_M) \quad (9)$$

In the above formula, M(•) represents a high-dimensional channel data fusion operator.

Step 3.2: Missing channel data in a wide-area spatial channel is completed according to formula (10) to obtain complete channel data and construct the wide-area spatial channel map.

$$\min_\chi \text{rank}(\chi) \quad (10)$$
$$\text{s.t. } \chi_\Omega = \pounds_\Omega$$

In the above formula, $\chi$ represents a tensor formed by modeling complete data of the wide-area spatial channel, $\Omega$ represents a set of measurement signal aerial receiving nodes, element $\pounds_\Omega$ of the spatial tensor $\pounds$ of the wide-area spatial channel tensor in the $\Omega$ represents channel data obtained by each measurement signal aerial receiving node, and rank(•) represents an operation of obtaining a rank of the tensor.

What is described above is merely the preferred implementations of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. A surveying and mapping instrument for a wide-area spatial channel map through a multi-unmanned aerial vehicle (UAV) cooperation, comprising: a measurement signal emission unit, a measurement signal multi-UAV cooperative receiving unit, and a channel data fusion processing unit, wherein the measurement signal emission unit generates and emits a measurement signal, the measurement signal multi-UAV cooperative receiving unit receives the measurement signal transmitted through a wireless channel, extracts an effective multipath component from the measurement signal, frames the effective multipath component and corresponding time and location information for storage, and transmits stored channel data to the channel data fusion processing unit offline, and the channel data fusion processing unit fuses the channel data in terms of space, time, and frequency dimensions, and completes missing channel data to construct a complete wide-area spatial channel map;

wherein the measurement signal multi-UAV cooperative receiving unit comprises M measurement signal aerial receiving nodes, and each of the measurement signal aerial receiving nodes comprises a low noise amplifier module, a channel response extraction module, a system response elimination module, a channel response compensation module, a multipath component extraction module, a Global Position System (GPS) module 2, a channel parameter framing module, and an UAV data storage module, wherein the low noise amplifier module performs a low noise amplification on the measurement signal received by a receiving antenna and transmits the amplified measurement signal to the channel response extraction module, the channel response extraction module extracts an original channel impulse response, the system response elimination module obtains a system response of a measurement system through a back-to-back measurement and eliminates the system response, the channel response compensation module compensates for a power loss of a channel impulse response due to a sampling time offset between receiving and emission nodes, the multipath component extraction module extracts an effective multipath component from the channel impulse response by adopting an adaptive noise threshold, the GPS module 2 uses a pulse per second signal to trigger a reception of the measurement signal, and obtains time and location information of the measurement signal aerial receiving nodes, the channel parameter framing module frames the effective multipath component and its corresponding time and location information, and framed channel data is stored in the UAV data storage module.

2. The surveying and mapping instrument for the wide-area spatial channel map through the multi-UAV cooperation according to claim 1, wherein the measurement signal emission unit comprises a measurement parameter configuration module, a measurement signal generation module, a power amplifier module, and a GPS module 1, wherein
the measurement parameter configuration module is configured to configure channel measurement parameters, the measurement signal generation module generates the measurement signal based on the configured channel measurement parameters, the power amplifier module performs a power amplification on the generated measurement signal, such that the amplified measurement signal is emitted by a emission antenna, and the GPS module 1 uses a pulse per second signal to trigger an emission of the measurement signal.

3. The surveying and mapping instrument for the wide-area spatial channel map through the multi-UAV cooperation according to claim 1, wherein the channel data fusion processing unit comprises a channel data storage module, a channel data fusion module, a channel data completion module, and a channel map generation module, wherein
in a ground server, the channel data storage module performs offline transmission and storage on the channel data stored by the UAV data storage module, the channel data fusion module fuses the collected channel data in terms of the space, time, and frequency dimensions, the channel data completion module completes the missing channel data in wide-area space to obtain complete channel data, and the channel map generation module constructs the wide-area spatial channel map based on the complete channel data.

4. A surveying and mapping method for a wide-area spatial channel map through a multi-UAV cooperation, comprising following steps:
step 1: configuring channel measurement parameters, and generating a measurement signal based on the configured measurement parameters, performing a power amplification on the measurement signal, and then radiating the amplified measurement signal by using an emission antenna of a measurement signal emission unit;
step 2: receiving, by a receiving antenna of each measurement signal aerial receiving node, the measurement signal transmitted through a wireless channel, extracting an original channel impulse response from the measurement signal after performing a low noise amplification on the measurement signal, obtaining a system response of a measurement system through a back-to-back measurement and eliminating the system response, compensating for a power loss of a channel impulse response due to a sampling time offset between receiving and emission nodes, extracting an effective multipath component from the channel impulse response by adopting an adaptive noise threshold, and framing the effective multipath component and corresponding time and location information for storage; and
step 3: fusing framed channel data in terms of space, time, and frequency dimensions, and completing missing channel data to generate a wide-area spatial channel map.

5. The surveying and mapping method for the wide-area spatial channel map through the multi-UAV cooperation according to claim 4, wherein in step 1, the channel measurement parameters comprise a center frequency f, a sampling rate $f_s$, a measurement signal length $N_{seq}$, a sinc filter oversampling rate I, a reference unit length W, a protection unit quantity $N_P$, and a false alarm probability P, wherein sinc(•) denotes a sinc function; and
the measurement signal x[n] is generated based on the configured measurement parameters:

$$x[n] = \exp\left(-\frac{j\pi n^2}{N_{seq}}\right)$$

wherein n=0, 1, . . . , $N_{seq}$−1, and j denotes an imaginary number.

6. The surveying and mapping method for the wide-area spatial channel map through the multi-UAV cooperation according to claim 5, wherein step 2 comprises following specific substeps:
step 2.1: obtaining the original channel impulse response h[n]:

$$h_s[n]=y[n]*\hat{x}*[n]$$

wherein y[n] represents the measurement signal transmitted through the wireless channel, $\hat{x}*[n]$ represents a conjugate inverse sequence of the measurement signal x[n], and * represents a convolution operation;
step 2.2: calculating a channel frequency domain transfer function $H_s[k]$:

$$H_s[k]=Y[k]\cdot\hat{X}*[k]$$

wherein $H_s[k]$ represents a frequency domain representation of the $h_s[n]$, and Y[k] and $\hat{X}*[k]$ respectively represent Fourier transforms of the y[n] and the $\hat{x}*[n]$;
step 2.3: obtaining the system response G[k] of the measurement system through a back-to-back connection, eliminating the system response, and obtaining the channel impulse response h[n]:

$$h[n]=\text{IFFT}(H_s[k]/G[k])$$

wherein IFFT(•) represents inverse Fourier transform;
step 2.4: performing a power compensation on the channel impulse response h[n] with the sampling time offset according to a following formula:

$$h_{STOC}[m] = \sum_{n=m-1}^{m+1} h[n]\cdot\text{sinc}\left(\frac{m-n}{I}\right)$$

wherein $h_{STOC}[m]$ represents a compensated channel impulse response, m=0, 1, . . . , N−1, and N represents a sequence length of the h[n];
step 2.5: generating the adaptive noise threshold Thr[l] for the compensated channel impulse response $h_{STOC}[m]$:

$$\text{Thr}[l] = \alpha\cdot\frac{1}{W}\left[\sum_{w=l-\frac{W}{2}-\frac{N_p}{2}}^{l-\frac{N_p}{2}-1} h_{STOC}[w] + \sum_{w=l+\frac{N_p}{2}+1}^{l+\frac{W}{2}+\frac{N_p}{2}} h_{STOC}[w]\right]$$

wherein $$l = 1 + \frac{W}{2} + \frac{N_p}{2},$$

..., $$N - \frac{W}{2} - \frac{N_p}{2},$$

and $$\alpha = W \cdot \left(P^{\frac{1}{W}} - 1\right)$$

represents a threshold factor;

step 2.6: extracting the effective multipath component S from the channel impulse response by using the adaptive noise threshold according to a following formula:

$$S = \{\tau_i, P_i | \text{peak}(h_{STOC}[l]) > Thr[l]\}$$

wherein $\tau_i$ and $P_i$ respectively represent a delay and power of an $i^{th}$ extracted effective multipath component, and peak(•) represents an operation of obtaining a peak value of the channel impulse response; and step 2.7: framing a multipath component extracted by a $p^{th}$ measurement signal aerial receiving node and its corresponding time and location information to form the channel data that is represented by a tensor $\Gamma_p$, $$\Gamma_p = \{S_p, L_{RX,p}, L_{TX}, t_p, f_p\} \in R^{I_1 \times I_2 \cdots \times I_{10}}$$

wherein $p \in [1, M]$, M represents a quantity of measurement signal aerial receiving nodes, $S_p$ represents a vector of the effective multipath component extracted by the $p^{th}$ measurement signal aerial receiving node; $L_{RX,\,p}$ and $L_{TX}$ respectively represent three-dimensional location vectors of the $p^{th}$ measurement signal aerial receiving node and the measurement signal emission unit, $t_p$ represents a time vector, $f_p$ represents a frequency vector, and $I_1 \times I_2 K \times I_{10}$ represents that the $\Gamma_p$ is a $10^{th}$-order real tensor.

7. The surveying and mapping method for the wide-area spatial channel map through the multi-UAV cooperation according to claim 6, wherein step 3 comprises following specific substeps:

step 3.1: fusing the channel data to obtain a representation of a spatial tensor £ of a wide-area spatial channel:

$$£ = M(\Gamma_1, \Gamma_2, \ldots, \Gamma_p, \ldots, \Gamma_M)$$

wherein M(•) represents a high-dimensional channel data fusion operator; and step 3.2: completing a tensor of the missing channel data in the wide-area spatial channel according to a following formula:

$$\min_{\chi} \text{rank}(\chi)$$
$$\text{s.t. } \chi_\Omega = £_\Omega$$

wherein $\chi$ represents a tensor formed by modeling complete data of the wide-area spatial channel, $\Omega$ represents a set of measurement signal aerial receiving nodes, an element $£_\Omega$ of the spatial tensor £ of the wide-area spatial channel in the $\Omega$ represents channel data obtained by each measurement signal aerial receiving node, and rank(•) represents an operation of obtaining a rank of the tensor.

\* \* \* \* \*